(12) United States Patent
Hu et al.

(10) Patent No.: US 12,425,700 B2
(45) Date of Patent: Sep. 23, 2025

(54) METHOD FOR PROVIDING AND METHOD FOR ACQUIRING IMMERSIVE MEDIA, APPARATUS, DEVICE, AND STORAGE MEDIUM

(71) Applicant: TENCENT TECHNOLOGY (SHENZHEN) COMPANY LIMITED, Guangdong (CN)

(72) Inventors: Ying Hu, Shenzhen (CN); Xiao Zhong Xu, Shenzhen (CN); Shan Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 45 days.

(21) Appl. No.: 17/679,877

(22) Filed: Feb. 24, 2022

(65) Prior Publication Data

US 2022/0182687 A1 Jun. 9, 2022

Related U.S. Application Data

(63) Continuation of application No. PCT/CN2021/077360, filed on Feb. 23, 2021.

(30) Foreign Application Priority Data

Mar. 24, 2020 (CN) .......................... 202010211178.6

(51) Int. Cl.
*H04N 21/2343* (2011.01)
*H04L 65/612* (2022.01)
(Continued)

(52) U.S. Cl.
CPC ......... *H04N 21/816* (2013.01); *H04L 65/612* (2022.05); *H04L 65/756* (2022.05);
(Continued)

(58) Field of Classification Search
CPC ....... H04N 21/2353; H04N 21/234363; H04N 21/816; H04N 21/84
(Continued)

(56) References Cited

U.S. PATENT DOCUMENTS

2009/0184962 A1 7/2009 Kuriakose et al.
2011/0225417 A1* 9/2011 Maharajh .............. H04L 65/752
 713/150

(Continued)

FOREIGN PATENT DOCUMENTS

CN 102948148 A 2/2013
CN 103493500 A 1/2014
(Continued)

OTHER PUBLICATIONS

International Search Report for PCT/CN2021/077360 dated, May 13, 2021 (PCT/ISA/210).
(Continued)

*Primary Examiner* — Alfonso Castro
(74) *Attorney, Agent, or Firm* — Sughrue Mion, PLLC

(57) ABSTRACT

A method for providing immersive media, performed by at least one processor includes adding resolution description information and resolution selection strategy information to file format information of immersive media content, determining a target resolution to be provided to a client based on the resolution description information and the resolution selection strategy information of the immersive media content, and transmitting an immersive media file of the target resolution to the client.

16 Claims, 7 Drawing Sheets

(51) Int. Cl.
    *H04L 65/756* (2022.01)
    *H04L 67/04* (2022.01)
    *H04L 67/06* (2022.01)
    *H04N 21/235* (2011.01)
    *H04N 21/81* (2011.01)
    *H04N 21/84* (2011.01)
    *H04L 67/02* (2022.01)
    *H04L 67/10* (2022.01)

(52) U.S. Cl.
    CPC ............. *H04L 67/04* (2013.01); *H04L 67/06* (2013.01); *H04N 21/234363* (2013.01); *H04N 21/2353* (2013.01); *H04N 21/84* (2013.01); *H04L 67/02* (2013.01); *H04L 67/10* (2013.01)

(58) Field of Classification Search
    USPC ........................................................ 725/116
    See application file for complete search history.

(56) References Cited

U.S. PATENT DOCUMENTS

| | | | |
|---|---|---|---|
| 2016/0150212 A1* | 5/2016 | Moura | H04N 13/167 375/240.02 |
| 2017/0055013 A1 | 2/2017 | Hasek et al. | |
| 2017/0094184 A1* | 3/2017 | Gao | G06T 7/337 |
| 2017/0223083 A1* | 8/2017 | Maze | H04L 65/65 |
| 2018/0077451 A1* | 3/2018 | Yip | H04N 21/4112 |
| 2019/0045248 A1* | 2/2019 | Shen | H04L 65/65 |
| 2019/0089772 A1* | 3/2019 | Gavade | H04L 65/752 |
| 2019/0158815 A1* | 5/2019 | He | H04N 19/597 |
| 2020/0037029 A1* | 1/2020 | He | G06F 3/0304 |
| 2020/0275156 A1* | 8/2020 | He | H04N 21/816 |
| 2021/0152808 A1* | 5/2021 | He | H04N 21/84 |

FOREIGN PATENT DOCUMENTS

| | | | | |
|---|---|---|---|---|
| CN | 103825912 A | | 5/2014 | |
| CN | 104737178 A | | 6/2015 | |
| CN | 105933726 A | | 9/2016 | |
| CN | 106713895 A | | 5/2017 | |
| CN | 108462899 A | | 2/2018 | |
| EP | 3346709 A1 | * | 7/2018 | ........... H04N 19/119 |

OTHER PUBLICATIONS

Written Opinion of the International Searching Authority for PCT/CN2021/077360 dated, May 13, 2021 (PCT/ISA/237).

Extended European Search Report dated Feb. 10, 2023 in European Application No. 21777160.9.

* cited by examiner

METHOD FOR PROVIDING AND METHOD FOR ACQUIRING IMMERSIVE MEDIA, APPARATUS, DEVICE, AND STORAGE MEDIUM

CROSS-REFERENCE TO RELATED APPLICATION(S)

This application is a continuation application of International Application No. PCT/CN2021/077360, filed on Feb. 23, 2021, which claims priority to Chinese Patent Application No. 202010211178.6, filed with the China National Intellectual Property Administration on Mar. 24, 2020, the entire contents of which are incorporated by reference herein.

FIELD

The disclosure relates to the field of audio and video technologies, and in particular, to a method and apparatus for providing immersive media, a method and apparatus for obtaining immersive media, a device, and a storage medium.

BACKGROUND

An objective of immersive media is to enable users to have an immersive audio-visual experience through audio and video technologies.

In the immersive media transmission solution, the industry has supported the preparation of file tracks of a plurality of different resolutions on a server side, but selection rules for the file tracks of the plurality of different resolutions have not been given. One manner is to randomly select a file track of a specific resolution and deliver the file track to a client, and the other manner is to deliver all the file tracks of the plurality of resolutions to the client.

However, neither of the above two manners balance user experience and bandwidth resource utilization.

SUMMARY

In accordance with an aspect of an example embodiment of the disclosure, a method for providing immersive media, performed by at least one processor, may include adding resolution description information and resolution selection strategy information to file format information of immersive media content, determining a target resolution to be provided to a client based on the resolution description information and the resolution selection strategy information of the immersive media content, and transmitting an immersive media file of the target resolution to the client.

In accordance with an aspect of an example embodiment of the disclosure, an apparatus may include at least one memory configured to store computer program code, and at least one processor configured to access said computer program code and operate as instructed by said computer program code, said computer program code including first adding code configured to cause the at least one processor to add resolution description information and resolution selection strategy information to file format information of immersive media content, first determining code configured to cause the at least one processor to determine a target resolution to be provided to a client based on the resolution description information and the resolution selection strategy information of the immersive media content, and first transmitting code configured to cause the at least one processor to transmit an immersive media file of the target resolution to the client.

In accordance with an aspect of an example embodiment of the disclosure, a—transitory computer-readable storage medium may store computer instructions that, when executed by at least one processor, cause the at least one processor to add resolution description information and resolution selection strategy information to file format information of immersive media content, determine a target resolution to be provided to a client based on the resolution description information and the resolution selection strategy information of the immersive media content, and transmit an immersive media file of the target resolution to the client.

According to another aspect, an embodiment of the disclosure provides a method for obtaining immersive media, performed by a terminal, the method including receiving an immersive media file of a target resolution from a server, file format information of immersive media content of the immersive media file including resolution description information and resolution selection strategy information, the resolution description information being used for defining a candidate resolution of the immersive media content, and the resolution selection strategy information being used for defining a resolution selection strategy of the immersive media content; and displaying the immersive media file according to the file format information.

According to another aspect, an embodiment of the disclosure provides an apparatus for providing immersive media, including an addition module, configured to add resolution description information and resolution selection strategy information to file format information of immersive media content; a resolution selection module, configured to determine a target resolution provided to a client according to the resolution description information and the resolution selection strategy information of the immersive media content; and a file transmission module, configured to transmit an immersive media file of the target resolution to the client.

According to another aspect, an embodiment of the disclosure provides an apparatus for obtaining immersive media, including: a file receiving module, configured to receive an immersive media file of a target resolution from a server, file format information of immersive media content of the immersive media file including resolution description information and resolution selection strategy information, the resolution description information being used for defining a candidate resolution of the immersive media content, and the resolution selection strategy information being used for defining a resolution selection strategy of the immersive media content; and a display module, configured to display the immersive media file according to the file format information.

In a further aspect, an embodiment of the disclosure provides a computer device, including a processor and a memory, the memory storing a processor executable instruction, the instruction, when executed by one or more processors, implementing the method for providing immersive media or the method for obtaining immersive media. The computer device is a server or a terminal.

In a further aspect, an embodiment of the disclosure provides a computer-readable storage medium, storing a processor executable instruction, the instruction, when executed by one or more processors, implementing the method for providing immersive media.

In a further aspect, an embodiment of the disclosure provides a computer-readable storage medium, storing a processor executable instruction, the instruction, when executed by one or more processors, implementing the method for obtaining immersive media.

In still yet another aspect, an embodiment of the disclosure provides a computer program product, the computer program product, when executed by a processor, being used for implementing the method for providing immersive media.

In still yet another aspect, an embodiment of the disclosure provides a computer program product, the computer program product, when executed by a processor, being used for implementing the method for obtaining immersive media.

BRIEF DESCRIPTION OF THE DRAWINGS

To describe the technical solutions in embodiments of the disclosure more clearly, the following briefly describes the accompanying drawings required for describing the embodiments. Apparently, the accompanying drawings in the following description show merely some embodiments of the disclosure, and a person of ordinary skill in the art may still derive other accompanying drawings from these accompanying drawings without creative efforts.

DETAILED DESCRIPTION

Exemplary embodiments are described in detail herein, and examples of the exemplary embodiments are shown in the accompanying drawings. When the following description involves the accompanying drawings, unless otherwise indicated, the same numerals in different accompanying drawings represent the same or similar elements. The implementations described in the following exemplary embodiments do not represent all implementations that are consistent with the disclosure. On the contrary, the implementations are merely examples of methods that are described in detail in the appended claims and that are consistent with some aspects of the disclosure.

The technical solutions provided in the embodiments of the disclosure may be applied to any immersive media playback scene, such as an immersive media on-demand or live broadcast scene.

Provided are a method and apparatus for providing immersive media, a method and apparatus for obtaining immersive media, a device, and a storage medium, which may adaptively select a resolution of immersive media content according to client capabilities, thereby improving bandwidth resource utilization while ensuring user experience.

Figure 1:
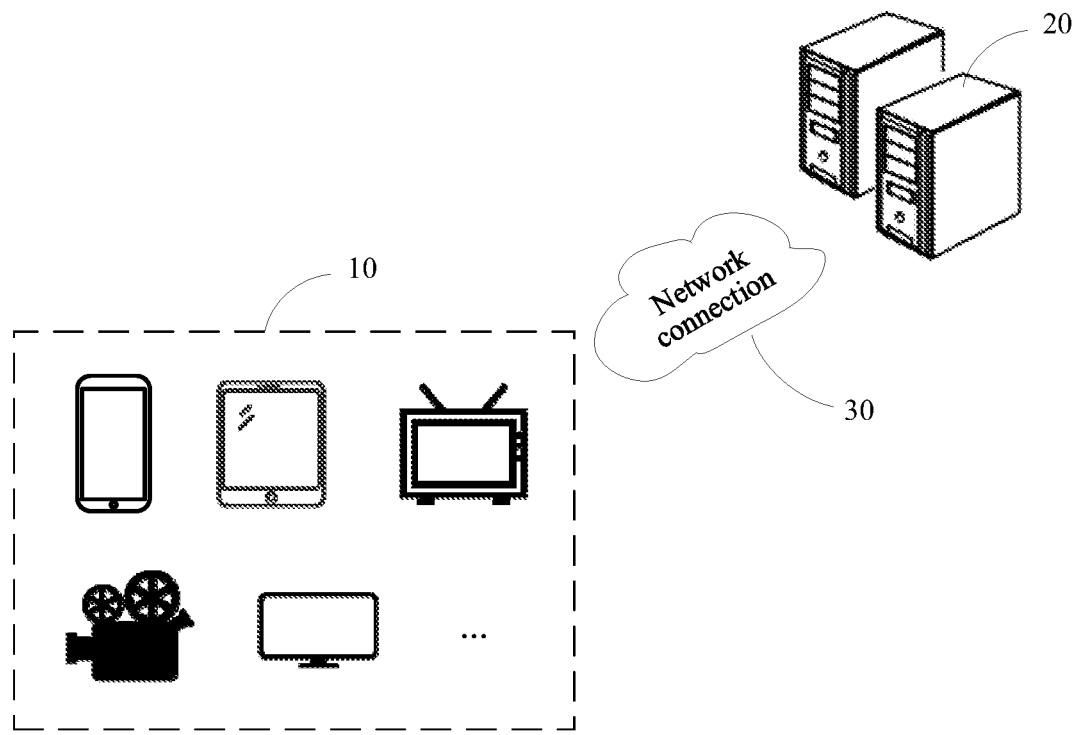
FIG. 1 is a diagram of an implementation environment according to an embodiment.

FIG. 1 is a diagram of an implementation environment according to an embodiment. The implementation environment may be implemented as an immersive media playback system. As shown in FIG. 1, the implementation environment may include a terminal 10 and a server 20.

The terminal 10 may be an electronic device such as a mobile phone, a tablet computer, a multimedia player, a television, a projector, a display, a wearable device, or a personal computer (PC). A client with an immersive media playback function may be installed and run on the terminal 10. For example, the client may interact with the server 20, request to obtain immersive media content from the server 20, and play the obtained immersive media content.

The server 20 is configured to provide the immersive media content. The server 20 may be one server, a server cluster including a plurality of servers, or a cloud computing service center.

The terminal 10 may communicate with the server 20 through a network 30. The network 30 may be a wired network or a wireless network.

One or more intermediate nodes may further be included between the terminal 10 and the server 20, such as a content delivery network (CDN) or another relay device or routing device, which is not limited in the embodiments of the disclosure.

Figure 2:
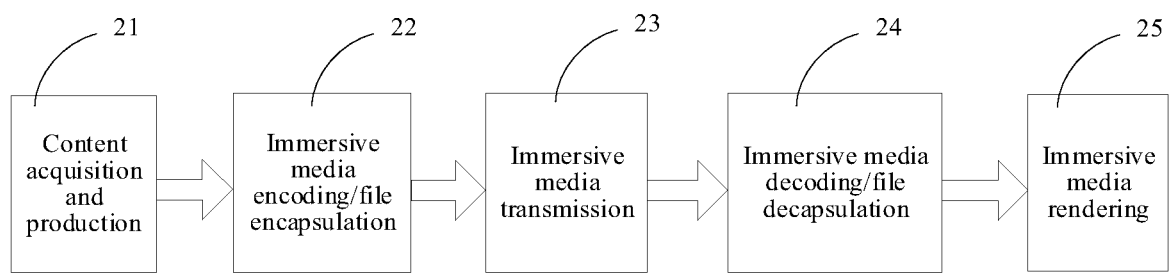
FIG. 2 is a diagram of an end-to-end processing procedure of an immersive media playback system according to an embodiment.

FIG. 2 is a diagram of an end-to-end processing procedure of an immersive media playback system according to an embodiment. The processing procedure may include content acquisition and production 21, immersive media encoding/file encapsulation 22, immersive media transmission 23, immersive media decoding/file decapsulation 24, immersive media rendering 25, and other major technical links. The technical links such as the content acquisition and production 21, the immersive media encoding/file encapsulation 22, and the immersive media transmission 23 may be performed by a server, and the technical links such as the immersive media decoding/file decapsulation 24, and the immersive media rendering 25 may be performed by a terminal (such as a client).

Figure 3:
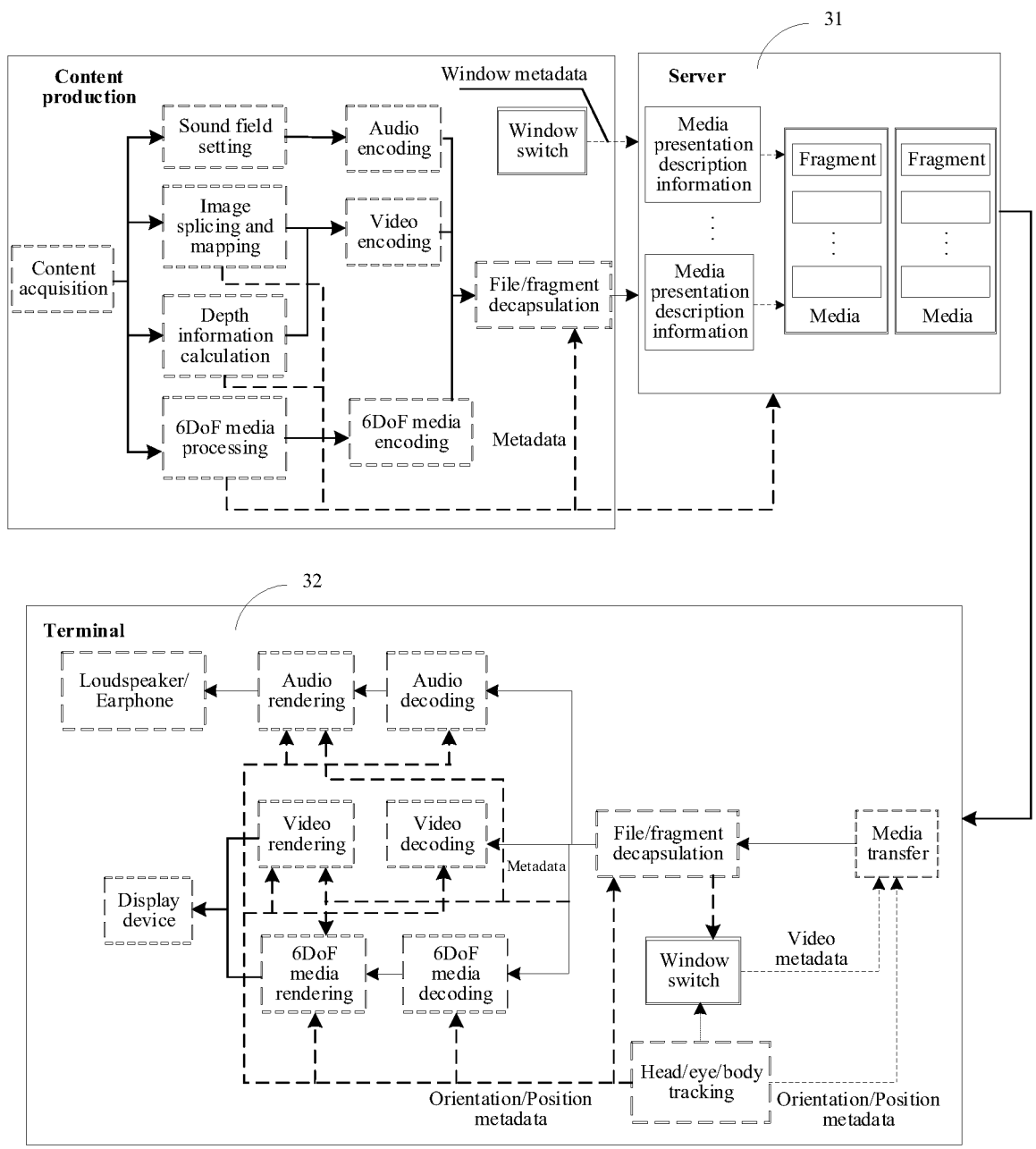
FIG. 3 is a diagram of a system processing architecture of an immersive media playback system according to an embodiment.

FIG. 3 is a diagram of a system processing architecture of an immersive media playback system according to an embodiment. FIG. 3 illustrates a system processing architecture of an immersive media playback system, including processing and expression of immersive media content, a file format, and transmission signaling that are from a server 31 to a terminal 32 (client).

An audio-visual scene in the real world is acquired by an audio sensor, a photographing device (such as an ordinary camera, a stereo camera, or a light-field camera), and a sensing device (for example, including LIDAR), and is converted into a series of data signals, and then produced into virtual reality content for users to view. The photographing device is deployed in a specific position to obtain video/image content in a specific space. Audio may be obtained through different microphone configurations. A video/image and the audio are kept synchronized in time and space. For video/image content production, 3 degrees of freedom (DoF) and 3DoF+ video production and 6DoF video production may be divided. DoF refers to degrees of freedom of movement supported and content interaction generated when the user views immersive media.

3DoF video production is performed by recording by a group of cameras or a photographing device with a plurality of cameras and sensors. The camera may usually obtain content in all directions around a center of a device.

3DoF+ video production is performed by combining a 3DoF video and depth information.

6DoF video production is mainly performed according to content in a form of a point cloud and a light field captured by a camera array. 6DoF media requires specific processing before encoding. For example, point cloud media needs to be cut and mapped before encoding.

The acquired audio/video is encoded into a corresponding audio and video stream. When the acquired video is represented by using point cloud data or light-field information, a corresponding encoding manner (such as point cloud encoding) needs to be adopted. Subsequently, the encoded media is encapsulated in a file container in a specific format (such as an International Standardization Organization base media file format (ISOBMFF) or another international standard system), and a media file is formed or an initialization fragment and a media fragment are formed according to a specific media file format with reference to description information of media/with reference to metadata and window metadata describing properties of media content.

The server 31 stores media presentation description/signaling information and media file resources. The media presentation description/signaling information provides adequate notification information to the client, such that corresponding media content is delivered to a player in a transmission mechanism for consumption. The client may adaptively and dynamically request the media file resources through quality/viewpoint according to a terminal status, such as head/eye/position tracking and network throughput.

A media file is transmitted to a user terminal 32 through a transmission mechanism such as Dynamic Adaptive Streaming over hypertext transfer protocol (HTTP) (DASH) and Smart Media Transport (SMT). After receiving the media file, the user terminal 32 performs a series of processing such as decapsulation, decoding, splicing/synthesizing, and rendering on the file to display the virtual reality content.

Figure 4:
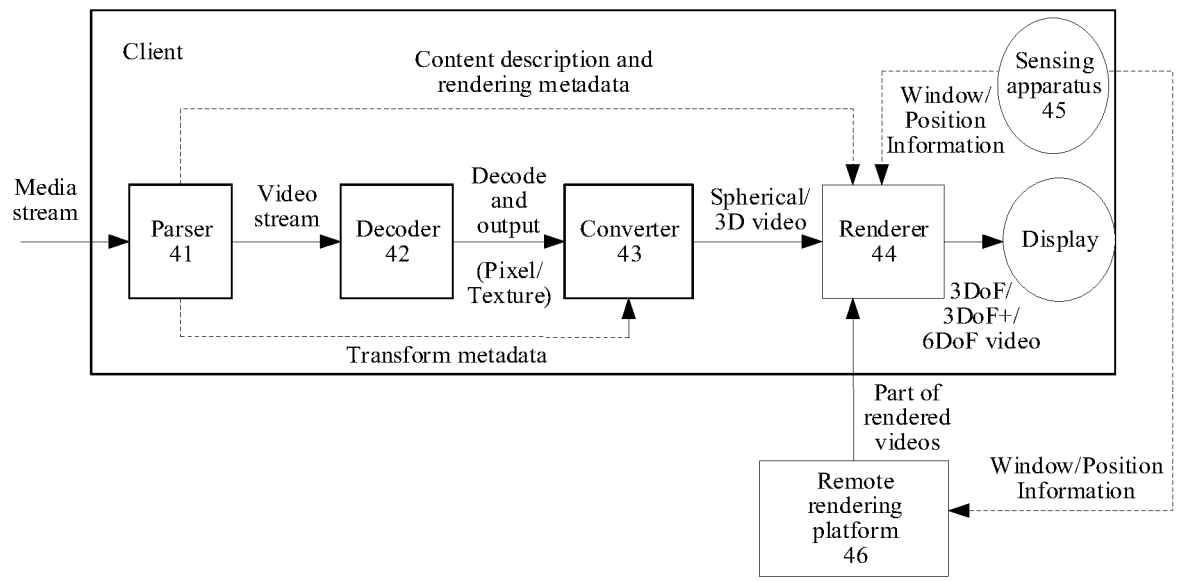
FIG. 4 is a diagram of a client reference model based on an immersive media application according to an embodiment.

FIG. 4 is a diagram of a client reference model based on an immersive media application, which defines various functional components of a client, according to an embodiment.

A user terminal selects a media file through recommendation of a far-end server or according to user requirements, and downloads the media file from the far-end server or receives the media file pushed by the far-end server, to display the virtual reality media content after the media file is processed by a series of components such as a parser 41, a decoder 42, a converter 43, and a renderer 44. In addition, the user terminal may perform remote rendering according to the user requirements.

The parser 41 is configured to process a media file or fragment, extract an elementary stream, and parse metadata, the parsed metadata being used for rendering. The parser 41 may perform dynamic information processing (such as tracking information of a user head and position) according to a user action, such as dynamically selecting a downloaded media fragment.

The decoder 42 is configured to decode a media stream provided by the parser 41 and output the decoded stream to the converter 43.

The converter 43 is configured to convert the decoded media into a spherical/three-dimensional (3D) video according to the metadata provided by the parser 41. For example, when 3DoF processing is performed, a planar image is mapped to a sphere, and a two-dimensional (2D) information stream is reconstructed into 3D data when 6DoF processing is performed based on mapping and projection. If necessary, the parser 41 may be used to parse the converted metadata.

The renderer 44 is configured to render the video/audio by using decoded signaling, rendering metadata, and window information (or considering other possible information). 3DoF and 3DoF+ are mainly used to render spherical media content based on a current viewpoint, parallax, and depth information, and 6DoF is used to render 3D media content in a window in which the current viewpoint is located.

A sensing apparatus 45 is configured to obtain a direction of a current window and position information of the user according to the movement of the user, and feed the direction of the current window and the position information of the user back to the parser 41 of the user terminal. The user terminal may select to download appropriate media according to the window, the direction of the window, and the position information of the user, or the parser 41 selects an appropriate media file according to the window and the position information of the user.

A remote rendering platform 46 is deployed on a far-end server, and performs rendering according to the window, the direction of the window, and the position information of the user fed back by the user terminal or the rendering metadata in the media file, and the user terminal directly displays according to rendering media of the remote rendering platform.

In addition, in the embodiments of the disclosure, a resolution of immersive media is equivalent to subjective quality of the immersive media, objective quality of the immersive media, and a definition of the immersive media.

The resolution of the immersive media may include a plurality of different resolution appellations such as 8K, 4K, 2K, 1080p, and 720p. Typical resolution values (that is, the number of pixels in a horizontal direction×the number of pixels in a vertical direction) represented by the resolution appellations are exemplarily shown in Table-1 below:

TABLE 1

Resolution introduction

| Resolution | The number of pixels in a horizontal direction × the number of pixels in a vertical direction | Alternative name | Commonly used device |
|---|---|---|---|
| 8K | 7680 × 4320 | 8K UHD | Television |
| Cinema 4K | 4096 × [the number of pixels not fixed in a vertical direction] | 4K | Projector |
| UHD | 3840 × 2160 | 4K, Ultra HD, Ultra-High Definition | Television, Display |
| 2K | 2048 × [the number of pixels not fixed in a vertical direction] | None | Projector |
| 1080p | 1920 × 1080 | Full HD, FHD, HD, High Definition | Television, Display |

TABLE 1-continued

Resolution introduction

| Resolution | The number of pixels in a horizontal direction × the number of pixels in a vertical direction | Alternative name | Commonly used device |
|---|---|---|---|
| 720p | 1280 × 720 | HD, High Definition | Television, Display |

The technical solutions of the disclosure are described in detail below by using several embodiments.

Figure 5A:
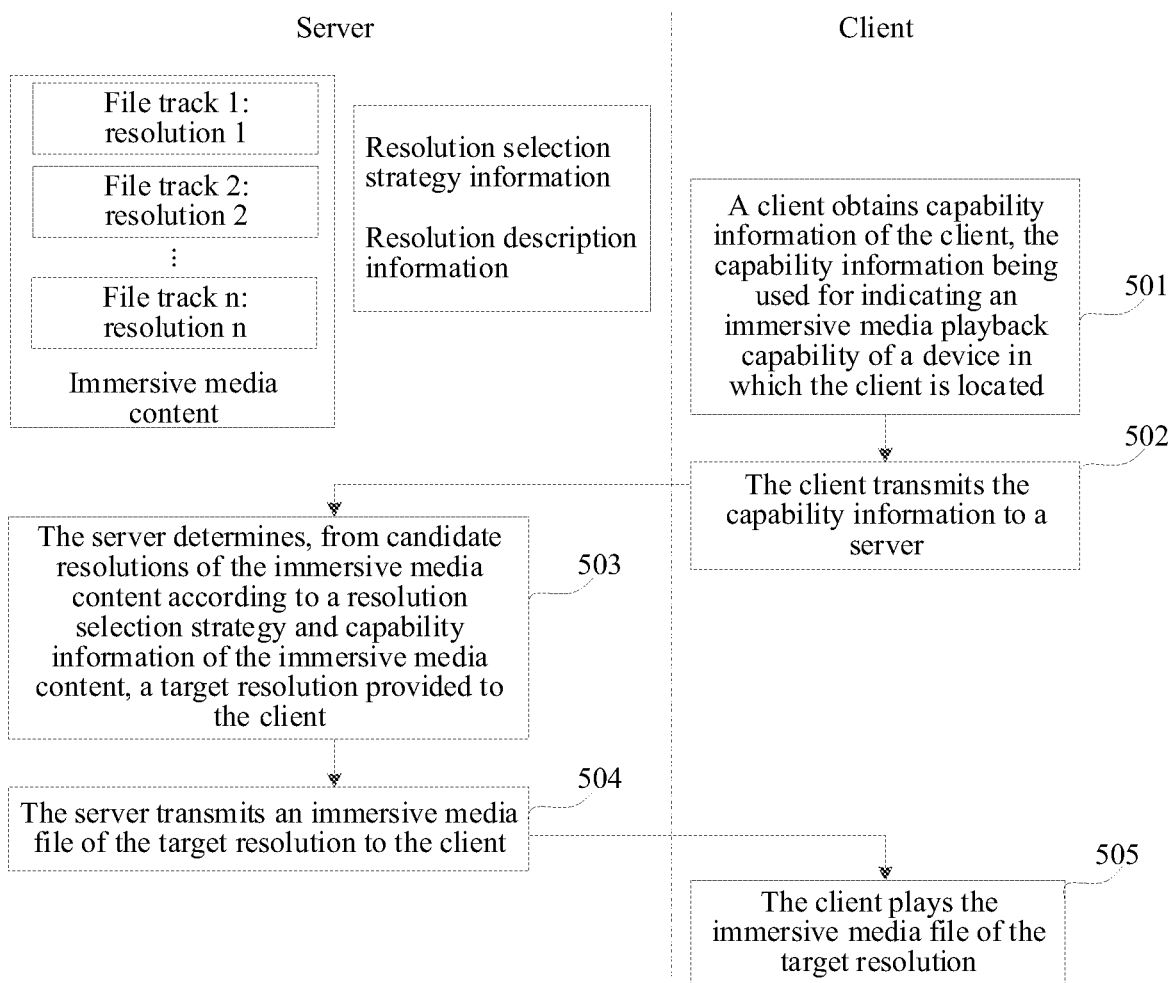
FIG. 5A is a flowchart of a method for providing immersive media according to an embodiment.

FIG. 5A is a flowchart of a method for providing immersive media according to an embodiment. The method may be applied to the implementation environment shown in FIG. 1. The method may include the following operations (501 to 504):

In operation 501, a client obtains capability information of the client, the capability information being used for indicating an immersive media playback capability of a device in which the client is located.

The capability information may include at least one of the following: device capability information, user permission information, and user bandwidth information. The device capability information is used for reflecting a processing capability of the device in which the client is located, such as a rendering capability of immersive media content. The device capability information may be used for indicating a maximum resolution supported by the device in which the client is located, to inform a server of a maximum resolution that the device in which the client is located may render and play. The user permission information is used for reflecting user permission corresponding to the client, such as level and/or permission information of a user account logged in the client. The user permission information may be used for indicating a maximum resolution supported by the user permission corresponding to the client, to inform the server of a maximum resolution that a user of the client may view. The user bandwidth information is used for reflecting a bandwidth capability of the client, for example, the user bandwidth information is used for indicating a user bandwidth upper limit corresponding to the client.

The capability information described above is merely exemplary and interpretive. In some other embodiments, the capability information may further include other information, which is not limited in the embodiments of the disclosure. For example, the capability information may further include user network information, to inform the server of a network type used by the client, such as a cellular network or a wireless fidelity (Wi-Fi) network.

In operation 502, the client transmits the capability information to the server.

The client transmits the capability information to the server through a network connection with the server. Correspondingly, the server receives the capability information from the client.

In addition, the capability information may be carried in a request message (for example, an immersive media playback request, used for requesting playback of immersive media content) and transmitted, or may be transmitted independently, which is not limited in this embodiment of the disclosure.

In operation 503, the server determines, from candidate resolutions of the immersive media content according to a resolution selection strategy and capability information of the immersive media content, a target resolution provided to the client.

A server side stores the immersive media content and the resolution selection strategy of the immersive media content. The immersive media content includes at least one candidate resolution. The immersive media content may include a plurality of candidate resolutions. The server determines, from the plurality of candidate resolutions of the immersive media content and with reference to the resolution selection strategy of the immersive media content and the capability information transmitted by the client, the target resolution provided to the client. The target resolution may be one of the plurality of candidate resolutions.

The resolution selection strategy of the immersive media content may be preset and stored in the server side. The resolution selection strategy may be that candidate resolutions that meet capability information requirements are sifted out from the plurality of candidate resolutions of the immersive media content, and a maximum resolution is selected as the target resolution from the candidate resolutions that meet the capability information requirements.

For example, the candidate resolutions of the immersive media content include 8K, 4K, 2K, 1080p, and 720p that are in descending order. Assuming that the capability information of the client includes that a maximum resolution for rendering supported by the device in which the client is located is 4K, a user permission corresponding to the client is a common permission, and a maximum resolution supported by the common permission is 2K, the server selects 2K as the target resolution.

In another example, the candidate resolutions of the immersive media content include 8K, 4K, 2K, 1080p, and 720p that are in descending order. Assuming that the capability information of the client includes that a maximum resolution for rendering supported by the device in which the client is located is 4K, a user permission corresponding to the client is a high-ranking permission, a maximum resolution supported by the high-ranking permission is 8K, a user bandwidth upper limit corresponding to the client is 10 mbps, and a maximum resolution supported by the user bandwidth upper limit is 4K, the server selects 4K as the target resolution.

In operation 504, the server transmits an immersive media file of the target resolution to the client.

The immersive media content may include file tracks of the plurality of candidate resolutions. After determining the target resolution, the server encapsulates a file track of the target resolution as an immersive media file and delivers the immersive media file to the client. The server transmits the immersive media file of the target resolution of the immersive media content to the client through the network connection with the client. Correspondingly, the client receives the immersive media file of the target resolution from the server.

As shown in FIG. 5A, this embodiment of the disclosure further includes the following operation 505:

In operation 505, the client plays the immersive media file of the target resolution.

After receiving the immersive media file of the target resolution, the client may play the immersive media file.

Figure 5B:
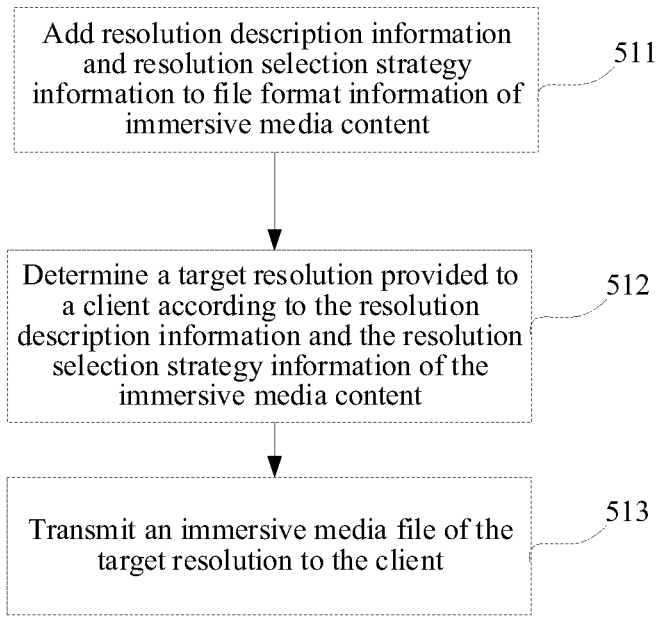
FIG. 5B is a flowchart of a method for providing immersive media according to an embodiment.

FIG. 5B is a flowchart of a method for providing immersive media according to an embodiment. The method may be applied to the implementation environment shown in FIG. 1, and in particular, may be applied to the server 20 in FIG. 1. The method may include the following operations (511 to 513):

In operation 511, the system adds resolution description information and resolution selection strategy information to file format information of immersive media content. Descriptions of the resolution description information and the resolution selection strategy information are the same as those of in other embodiments of the disclosure, and details are not described herein again.

In step 512, the system determines a target resolution provided to a client according to the resolution description information and the resolution selection strategy information of the immersive media content.

In operation 513, the system transmits an immersive media file of the target resolution to the client.

Figure 5C:
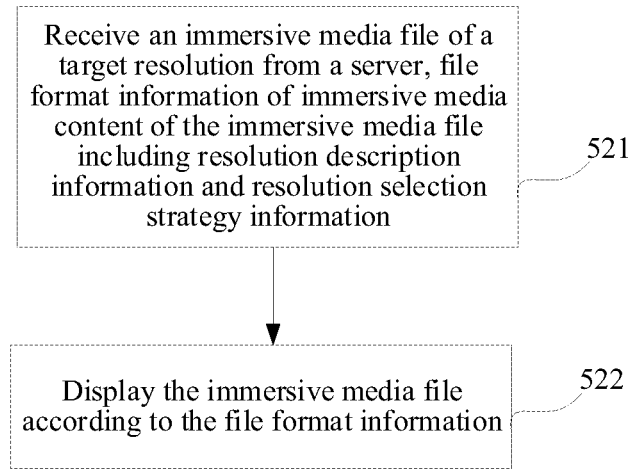
FIG. 5C is a flowchart of a method for providing immersive media according to an embodiment.

FIG. 5C is a flowchart of a method for providing immersive media according to an embodiment. The method may be applied to the implementation environment shown in FIG. 1, and in particular, may be applied to the terminal 10 in FIG. 1. The method includes the following operations (521 to 522):

In operation 521, the system receives an immersive media file of a target resolution from a server, file format information of immersive media content of the immersive media file including resolution description information and resolution selection strategy information, the resolution description information being used for defining a candidate resolution of the immersive media content, and the resolution selection strategy information being used for defining a resolution selection strategy of the immersive media content.

In operation 522, the system displays the immersive media file according to the file format information.

Based on the above, in the technical solutions provided in the embodiments of the disclosure, according to the capability information of the client and the resolution selection strategy of the immersive media content, the immersive media file of the target resolution is selected from the candidate resolutions of the immersive media content and is transmitted to the client. A technical solution for adaptively selecting a resolution of the immersive media content according to client capabilities is provided, and a maximum resolution may be selected from the candidate resolutions that may meet requirements of client capability information and is provided to the client, thereby improving bandwidth resource utilization while ensuring user experience.

To realize the functions introduced in the above embodiments in FIG. 5A to FIG. 5C, it is necessary to define the resolution selection strategy and the candidate resolution of the immersive media content. In an exemplary embodiment, the file format information of immersive media content includes the resolution selection strategy information and the resolution description information. The resolution selection strategy information is used for defining the resolution selection strategy of the immersive media content. The resolution description information is used for defining the candidate resolution of the immersive media content. For different immersive media content, different resolution selection strategies and/or different candidate resolutions may be defined in the file format information, to improve the flexibility of adaptive resolution selection for the different immersive media content.

In an exemplary embodiment, the resolution selection strategy information includes a zoom strategy type field used for indicating a type (or referred to as an identifier) of a resolution selection strategy adopted by the immersive media content. When values of the zoom strategy type field are different, it indicates that different resolution selection strategies are adopted. Values corresponding to the resolution selection strategies may be predefined or preconfigured, which is not limited in this embodiment of the disclosure.

For example, a value of the zoom strategy type field is a first value, it indicates that the resolution selection strategy is that viewing quality is prioritized in a case that a device capability is adequate (i.e., that the device capability satisfies a predetermined condition, such as, for example, based on device capability information as described herein); and the value of the zoom strategy type field is a second value, it indicates that the resolution selection strategy is that the viewing quality is prioritized within a user bandwidth limitation in a case that the device capability is adequate. For example, the first value is 0, and the second value is 1. The resolution selection strategy described above is merely exemplary and interpretive. In this embodiment of the disclosure, the number, content, and a corresponding value of the resolution selection strategy are not limited, which may be flexibly set with reference to an actual situation.

The resolution selection strategy information may further include a zoom strategy description field used for providing a text description of the resolution selection strategy. The resolution selection strategy indicated by the zoom strategy type field may require some description information, such as a user bandwidth limit. The description information may be described in the zoom strategy description field. The resolution selection strategy information may further include a zoom strategy description length field used for indicating a length of the text description in the zoom strategy description field.

In an exemplary embodiment, the resolution description information includes a number indication field and a zoom ratio indication field. The number indication field is used for indicating the number of zoom regions included in the immersive media content, and the zoom ratio indication field is used for indicating a zoom ratio of the zoom region, different zoom regions being corresponding to different candidate resolutions. A spherical region of the same omnidirectional immersive media content (such as an omnidirectional video) or a 2D region on a projected image may have one or more zoom regions, where video data in different zoom regions has different resolutions or quality. The zoom ratio is a zoom ratio of the zoom region relative to an original region (that is, the spherical region or the 2D region).

Different zoom ratios are indicated when values of the zoom ratio indication field are different. The values corresponding to the zoom ratios may be predefined or preconfigured, which is not limited in this embodiment of the disclosure. For example, a value of the zoom ratio indication field is 0, it indicates that the zoom region is not zoomed relative to the original region; the value of the zoom ratio indication field is 1, it indicates that the zoom region is ½ of the original region in width and height; the value of the zoom ratio indication field is 2, it indicates that the zoom region is ¼ of the original region in width and height; the value of the zoom ratio indication field is 3, it indicates that the zoom region is ⅙ of the original region in width and height; and the value of the zoom ratio indication field is 4, it indicates that the zoom region is ⅛ of the original region in width and height. The zoom ratio described above is merely exemplary and interpretive. The number and a corresponding value of the zoom ratio are not limited in this embodiment of the disclosure, which may be flexibly set with reference to an actual situation.

The resolution description information further includes at least one of the following fields: a zoom algorithm type field, a zoom symbolization type field, a zoom region type field, and a zoom region description field. The zoom algorithm type field is used for indicating a zoom algorithm type of the zoom region. The zoom symbolization type field is used for indicating boundary symbolization type of the zoom region. The zoom region type field is used for indicating a type of the zoom region. The zoom region description field is used for providing a text description of the zoom region.

The following uses a form of an extended ISOBMFF data box as an example to introduce definitions of the resolution selection strategy and the candidate resolution of immersive media content. File format information of the immersive media content may include the following zoom region structure:

```
aligned(8) class RegionWiseZoomingStruct( ) {
    unsigned int(8) num_regions;
    unsigned int(8) zoom_strategy_type;
    unsigned int(8) zoom_strategy_description_length;
    string zoom_strategy_description;
    for (i = 0; i < num_regions; i++) {
        unsigned int(32) zoom_reg_width[i];
        unsigned int(32) zoom_reg_height[i];
        unsigned int(32) zoom_reg_top[i];
        unsigned int(32) zoom_reg_left[i];
        unsigned int(8) zoom_ratio;
        unsigned int(8) zoom_algorithm_type;
        unsigned int(8) zoom_symbolization_type;
        unsigned int(8) zoom_area_type;
        string zoom_description;
    }
}
```

Semantics of each field in the zoom region structure RegionWiseZoomingStruct are as follows:

num_regions: the number indication field described above, which is used for indicating the number of zoom regions included in the immersive media content. For example, this field may indicate the number of zoom regions corresponding to spherical regions of the same omnidirectional video or 2D regions on a projected image. There may be one or more zoom regions, where video data in different zoom regions has different resolutions or quality.

zoom_strategy_type: the zoom strategy type field described above, which is used for indicating a resolution selection strategy adopted by the immersive media content. For example, this field may indicate a strategy type for selecting zoom regions of different resolutions or quality, and an example may be shown in Table-2 below:

TABLE 2

Zoom strategy type field

| Value | Description |
|---|---|
| 0 | The resolution selection strategy is that viewing quality is prioritized in a case that a device capability is adequate |
| 1 | The resolution selection strategy is that the viewing quality is prioritized within a user bandwidth limitation in a case that the device capability is adequate |
| 2~255 | Undefined | zoom_strategy_description_length: the zoom strategy description length field described above, which is used for indicating a length of the text description in the zoom strategy description field. For example, this field may indicate a length of a zoom strategy description section, and a byte is used as a unit.

zoom_strategy_description: the zoom strategy description field described above, which is used for providing the text description of the resolution selection strategy. For example, this field may be a UTF-8 string ended with a null character that provides a text description of a zoom strategy (that is, the resolution selection strategy).

zoom_reg_width[i], zoom_reg_height[i], zoom_reg_top[i], and zoom_reg_left[i] respectively define a width, a height, a vertical offset, and a horizontal offset of an $i^{th}$ zoom region, i being a positive integer.

zoom ratio: the zoom ratio indication field described above, which is used for indicating a zoom ratio of the zoom region. The allowed values for this field indicate different zoom ratios supported by a system. For example, a correspondence between a value of this field and the zoom ratio may be shown in Table-3 below:

TABLE 3

Zoom ratio indication field

| Value | Description |
|---|---|
| 0 | It indicates that the zoom region is not zoomed relative to an original region |
| 1 | It indicates that the zoom region is ½ of the original region in width and height |
| 2 | It indicates that the zoom region is ¼ of the original region in width and height |
| 3 | It indicates that the zoom region is ⅙ of the original region in width and height |
| 4 | It indicates that the zoom region is ⅛ of the original region in width and height |
| 5~255 | Undefined |

For ease of understanding a value of the zoom ratio indication field in an actual application, an example is used below for description.

Assuming that an original video track A corresponds to an 8K resolution, that is, a resolution of 7680×4320, zoom_ratio corresponding to the original video track A is 0.

Assuming that after downsampling a video, video tracks B and C of a 4K (3840×2160) resolution and 1080p (1920×1080) resolution are obtained. From a mathematical relation of 7680×4320, 3840×2160, and 1920×1080, it is can be learned that a width and a height of a zoom region corresponding to the video track B are respectively ½ of the original region, and a width and a height of a zoom region corresponding to the video track C are respectively ¼ of the original region. Therefore, zoom_ratio corresponding to the video track B is 1, and zoom_ratio corresponding to the video track C is 2.

Assuming that after downsampling a video, video tracks B and C of a cinema 4K (which is assumed to be 4096×2160) resolution and 2K (which is assumed to be 2048×1080) resolution are obtained. In this case, widths and heights of zoom regions corresponding to B and C are not mathematically strictly equal to ½ and ¼ of the original region. However, to avoid exhaustion, it is considered that the widths and the heights of the video track B and the video track C are approximately ½ and ¼ of the original video. In this case, zoom_ratio corresponding to the video track B is still 1, and zoom_ratio corresponding to the video track C is still 2.

zoom_algorithm_type: the zoom algorithm type field described above, which is used for indicating a zoom algorithm type of the zoom region.

zoom_symbolization_type: the zoom symbolization type field described above, which is used for indicating a boundary symbolization type of the zoom region.

zoom_area_type: the zoom region type field described above, which is used for indicating a type of the zoom region. For example, a correspondence between a value of this field and a zoom region type may be shown in Table-4 below:

TABLE 4

Zoom region type field

| Value | Description |
|---|---|
| 0 | A zoom region edited by a director, that is, a video is zoomed according to a creative intention of a content provider |
| 1 | A zoom region selected based on measurement of viewing statistics |
| 2~239 | Reserve |
| 240~255 | Undefined | zoom_description: the zoom region description field described above, which is a UTF-8 string ended with a null character and is used for providing the text description of the zoom region.

In this embodiment of the disclosure, a field is added to the file format information of the immersive media content to define the resolution selection strategy and the candidate resolution of the immersive media content, such that the server side may provide the client with the immersive media file of appropriate resolution according to the file format information, and technical support is provided for implementing adaptive resolution selection based on a capability of the client.

The technical solution of the disclosure is described below with reference to an example.

The server side stores a video file. Assuming that a resolution of a video that is not zoomed is 8K, the video file includes video file tracks of a plurality of resolutions (that is, a plurality of definitions), zoom ratio is 0 (corresponding to 8K resolution), 1 (corresponding to 4K resolution), and 2 (corresponding to 1080p resolution).

The server sets a resolution selection strategy to 1, that is, viewing quality is prioritized within a specific bandwidth limitation in a case that a device capability is adequate. The bandwidth is limited to 10 mbps, and is described in zoom_strategy_description as "Limit bandwidth: 10 mbps".

The client (or referred to as a player) transmits capability information to the server side. Assuming that user equipment A may consume 8K video, which is for an ordinary user; user equipment B may consume 4K video, which is for a high-ranking user; and user equipment C may consume 8K video, which is for a high-ranking user. For example, the high-ranking user has a higher priority than the ordinary user.

According to the capability information and the resolution selection strategy, the server determines any number of the following:

1. A user A is an ordinary user and needs to be limited by a bandwidth of 10 mbps. A video transmitted to the user A needs to be a video with a resolution of less than 8K and a bandwidth of less than 10 mbps (in this embodiment, assuming that the video is a 4K video). The video corresponds to a file track whose zoom ratio is 1. Therefore, the server re-encapsulates the file track whose zoom_ratio is 1 as a video file and transmits the video file to the user A.

2. A user B is a high-ranking user and is not limited by a bandwidth of 10 mbps. A video transmitted to the user B needs to be a video with the highest resolution that may be consumed by the user B, that is, 4K video. Therefore, the server re-encapsulates a file track whose zoom_ratio is 1 as a video file and transmits the video file to the user B.

3. A user C is a high-ranking user and is not limited by a bandwidth of 10 mbps. A video transmitted to the user C needs to be a video with the highest resolution that may be consumed by the user B, that is, 8K video. Therefore, the server re-encapsulates a file track whose zoom_ratio is 0 as a video file and transmits the video file to the user C.

The users A, B, and C consume the video files received thereof respectively.

In the foregoing embodiment, a value of the zoom ratio and a corresponding video resolution are not limited to the given examples. The server side may select an appropriate video file to a corresponding user according to video files of different resolutions stored in the server side. In addition, the server side may not necessarily store video files with resolutions corresponding to all possible zoom ratios. In this case, according to the existing video files with different resolutions and a resolution indicated by the zoom ratio, a video file that meets conditions and whose resolution is more approximate to a resolution of a target video may be selected and transmitted to a corresponding user.

In the foregoing embodiment, names and descriptions of the fields are merely exemplary and interpretive. On a premise of implementing the functions defined by the foregoing fields, the names and descriptions of the fields may be set with reference to an actual situation, and shall all fall within the scope of protection of the disclosure.

In the embodiments, the technical solutions of the disclosure are only described from the perspective of the interaction between the server and the client. The foregoing steps performed by the server may be independently implemented as a method for providing immersive media on a server side. The foregoing steps performed by the client may be independently implemented as a method for obtaining immersive media on a client side.

The following is an apparatus embodiment of the disclosure, which may be configured to perform the method embodiment of the disclosure. For details not disclosed in the apparatus embodiments of the disclosure, refer to the method embodiments of the disclosure.

Figure 6A:
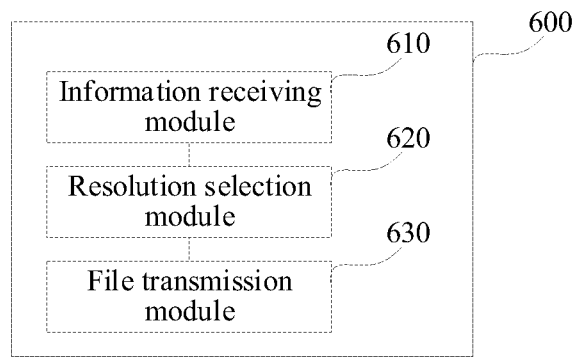
FIG. 6A is a block diagram of an apparatus for providing immersive media according to an embodiment.

FIG. 6A is a block diagram of an apparatus for providing immersive media according to an embodiment. The apparatus has functions of implementing examples of the method for providing immersive media. The functions may be implemented by hardware, or may be implemented by hardware executing corresponding software. The apparatus may be the server introduced above, or may be disposed on the server. The apparatus 600 may include an information receiving module 610, a resolution selection module 620, and a file transmission module 630.

The information receiving module 610 is configured to receive capability information of a client, the capability information being used for indicating an immersive media playback capability of a device in which the client is located.

The resolution selection module 620 is configured to determine, from candidate resolutions of immersive media content according to a resolution selection strategy and capability information of the immersive media content, a target resolution provided to the client.

The file transmission module 630 is configured to transmit an immersive media file of the target resolution to the client.

In an exemplary embodiment, the file format information of immersive media content includes resolution description information and resolution selection strategy information. The resolution description information is used for defining the candidate resolution of the immersive media content;

and the resolution selection strategy information is used for defining the resolution selection strategy of the immersive media content.

In an exemplary embodiment, the resolution selection strategy information includes a zoom strategy type field used for indicating a type of the resolution selection strategy adopted by the immersive media content.

In an exemplary embodiment, a value of the zoom strategy type field is a first value, indicating that the resolution selection strategy is that viewing quality is prioritized in a case that a device capability is adequate; and the value of the zoom strategy type field is a second value, indicating that the resolution selection strategy is that the viewing quality is prioritized within a user bandwidth limitation in a case that the device capability is adequate.

In an exemplary embodiment, the resolution selection strategy information further includes a zoom strategy description field used for providing a text description of the resolution selection strategy; and a zoom strategy description length field used for indicating a length of the text description in the zoom strategy description field.

In an exemplary embodiment, the resolution description information includes: a number indication field, used for indicating the number of zoom regions included in the immersive media content; and a zoom ratio indication field, used for indicating a zoom ratio of the zoom region, different zoom regions being corresponding to different candidate resolutions.

In an exemplary embodiment, a value of the zoom ratio indication field is 0, indicating that the zoom region is not zoomed relative to an original region; the value of the zoom ratio indication field is 1, indicating that the zoom region is ½ of the original region in width and height; the value of the zoom ratio indication field is 2, indicating that the zoom region is ¼ of the original region in width and height; the value of the zoom ratio indication field is 3, indicating that the zoom region is ⅙ of the original region in width and height; and the value of the zoom ratio indication field is 4, indicating that the zoom region is ⅛ of the original region in width and height.

In an exemplary embodiment, the resolution description information further includes: a zoom algorithm type field, used for indicating a zoom algorithm type of the zoom region; a zoom symbolization type field, used for indicating a boundary symbolization type of the zoom region; a zoom region type field, used for indicating a type of the zoom region; and a zoom region description field, used for providing a text description of the zoom region.

In an exemplary embodiment, capability information includes at least one of the following: device capability information, used for indicating a maximum resolution supported by a device in which a client is located; user permission information, used for indicating a maximum resolution supported by user permission corresponding to the client; or user bandwidth information, used for indicating a user bandwidth upper limit corresponding to the client.

Based on the above, in the technical solutions provided in the embodiments of the disclosure, according to the capability information of the client and the resolution selection strategy of the immersive media content, the immersive media file of the target resolution is selected from the candidate resolutions of the immersive media content and is transmitted to the client. A technical solution for adaptively selecting a resolution of the immersive media content according to client capabilities is provided, and a maximum resolution may be selected from the candidate resolutions that may meet requirements of client capability information and is provided to the client, thereby improving bandwidth resource utilization while ensuring user experience.

Figure 6B:
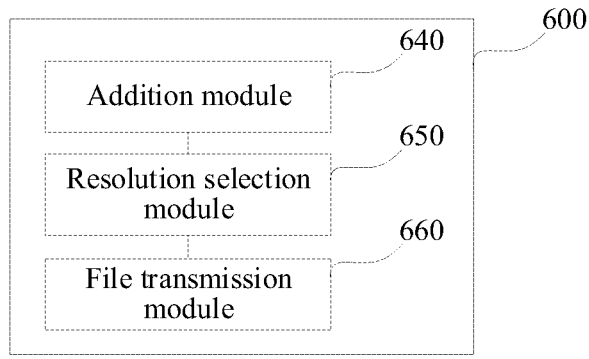
FIG. 6B is a block diagram of an apparatus for providing immersive media according to an embodiment.

FIG. 6B is a block diagram of an apparatus for providing immersive media according to an embodiment. The apparatus has functions of implementing examples of the method for providing immersive media. The functions may be implemented by hardware, or may be implemented by hardware executing corresponding software. The apparatus may be the server introduced above, or may be disposed on the server. The apparatus 600 may include an addition module 640, a resolution selection module 650, and a file transmission module 660.

The addition module 640 is configured to add resolution description information and resolution selection strategy information to file format information of immersive media content.

The resolution selection module 650 is configured to determine a target resolution provided to a client according to the resolution description information and the resolution selection strategy information of the immersive media content.

The file transmission module 660 is configured to transmit an immersive media file of the target resolution to the client.

Figure 7A:
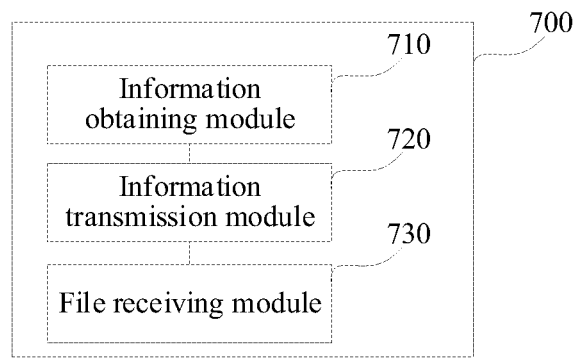
FIG. 7A is a block diagram of an apparatus for obtaining immersive media according to an embodiment.

FIG. 7A is a block diagram of an apparatus for obtaining immersive media according to an embodiment. The apparatus has functions of implementing examples of the method for obtaining immersive media. The functions may be implemented by hardware, or may be implemented by hardware executing corresponding software. The apparatus may be the terminal described above, or may be disposed on the terminal. The apparatus 700 may include an information obtaining module 710, an information transmission module 720, and a file receiving module 730.

The information obtaining module 710 is configured to obtain capability information of a client, the capability information being used for indicating an immersive media playback capability of a device in which the client is located.

The information transmission module 720 is configured to transmit the capability information to a server.

The file receiving module 730 is configured to receive an immersive media file of a target resolution from the server, the target resolution being determined from candidate resolutions of the immersive media content based on a resolution selection strategy of the immersive media content and the capability information.

In an exemplary embodiment, the capability information includes at least one of the following: device capability information, used for indicating a maximum resolution supported by a device in which a client is located; user permission information, used for indicating a maximum resolution supported by user permission corresponding to the client; or user bandwidth information, used for indicating a user bandwidth upper limit corresponding to the client.

Figure 7B:
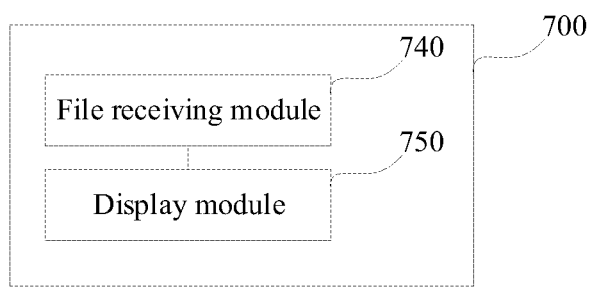
FIG. 7B is a block diagram of an apparatus for obtaining immersive media according to an embodiment.

FIG. 7B is a block diagram of an apparatus for obtaining immersive media according to an embodiment. The apparatus has functions of implementing examples of the method for obtaining immersive media. The functions may be implemented by hardware, or may be implemented by hardware executing corresponding software. The apparatus may be the terminal described above, or may be disposed on the terminal. The apparatus 700 may include a file receiving module 740 and a display module 750.

The file receiving module 740 is configured to receive an immersive media file of a target resolution from a server, file format information of immersive media content of the immersive media file including resolution description information and resolution selection strategy information, the resolution description information being used for defining a candidate resolution of the immersive media content, and the resolution selection strategy information being used for defining a resolution selection strategy of the immersive media content.

The display module 750 is configured to display the immersive media file according to the file format information.

Based on the above, in the technical solutions provided in the embodiments of the disclosure, according to the capability information of the client and the resolution selection strategy of the immersive media content, the immersive media file of the target resolution is selected from the candidate resolutions of the immersive media content and is transmitted to the client. A technical solution for adaptively selecting a resolution of the immersive media content according to client capabilities is provided, and a maximum resolution may be selected from the candidate resolutions that may meet requirements of client capability information and is provided to the client, thereby improving bandwidth resource utilization while ensuring user experience.

When the apparatus provided in the foregoing embodiments implements functions of the apparatus, the division of the foregoing functional modules is merely an example for description. In the practical application, the functions may be assigned to and completed by different functional modules according to the requirements, that is, the internal structure of the device is divided into different functional modules, to implement all or some of the functions described above. In addition, the apparatus and method embodiments provided in the foregoing embodiments belong to the same concept. For the specific implementation process, reference may be made to the method embodiments, and details are not described herein again.

Figure 8:
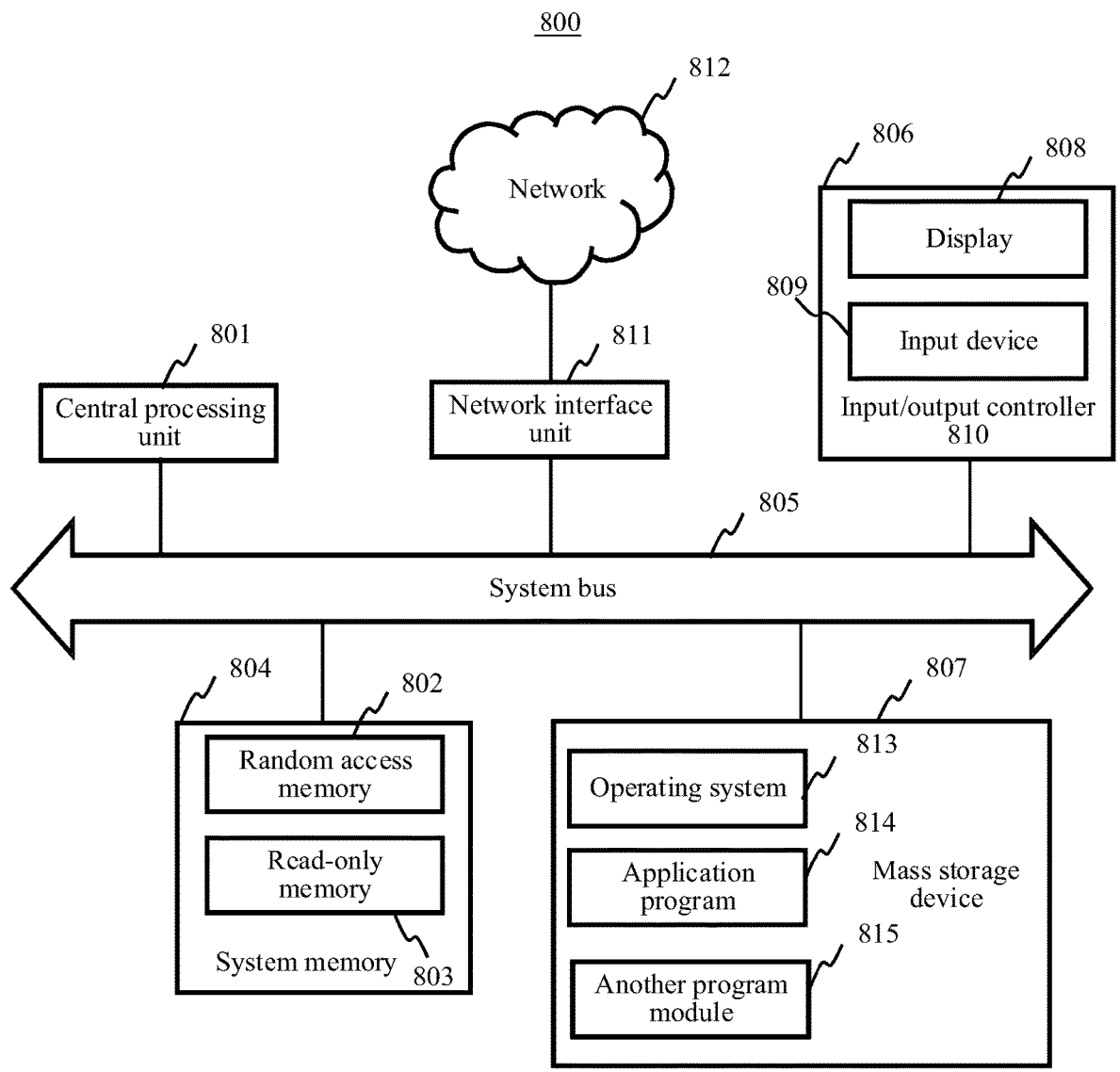
FIG. 8 is a diagram of a server according to an embodiment.

FIG. 8 is a diagram of a server according to an embodiment. The server may be configured to implement the method for providing immersive media provided in the foregoing embodiments.

The server 800 includes a central processing unit (CPU) 801, a system memory 804 including a random access memory (RAM) 802 and a read-only memory (ROM) 803, and a system bus 805 connecting the system memory 804 and the CPU 801. The server 800 further includes a basic input/output (I/O) system 806 assisting in transmitting information between devices in a computer, and a mass storage device 807 configured to store an operating system 813, an application program 814, and another program module 812.

The basic input/output system 806 includes a display 808 configured to display information and an input device 809 such as a mouse or a keyboard that is used for inputting information by a user. The display 808 and the input device 809 are both connected to the central processing unit 801 by using the system bus 805 connected to an input/output controller 810. The basic input/output system 806 may further include the input/output controller 810 to be configured to receive and process inputs from a plurality of other devices such as a keyboard, a mouse, and an electronic stylus. Similarly, the input/output controller 810 further provides an output to a display screen, a printer or another type of output device.

The mass storage device 807 is connected to the central processing unit 801 by using a mass storage controller connected to the system bus 805. The mass storage device 807 and a computer-readable medium associated with the mass storage device 807 provide non-volatile storage for the server 800. That is, the mass storage device 807 may include a computer-readable medium such as a hard disk or a compact disc ROM (CD-ROM) drive.

Generally, the computer-readable medium may include a computer storage medium and a communication medium. The computer storage medium includes volatile and non-volatile media, and removable and non-removable media implemented by using any method or technology and configured to store information such as a computer-readable instruction, a data structure, a program module, or other data. The computer storage medium includes a RAM, a ROM, an erasable programmable ROM (EPROM), an electrically erasable programmable ROM (EEPROM), a flash memory or another solid-state memory technology, a CD-ROM, a high density digital versatile disc (DVD) or another optical memory, a magnetic cassette, a magnetic tape, a magnetic disk memory, or another magnetic storage device. A person skilled in art may learn that the computer storage medium is not limited to the foregoing several types. The system memory 804 and the mass storage device 807 may be collectively referred to as a memory.

According to various embodiments of the disclosure, the server 800 may further be connected, by using a network such as the Internet, to a remote computer on the network and run. That is, the server 800 may be connected to a network 812 by using a network interface unit 811 that is connected to the system bus 805, or may be connected to a network of another type or a remote computer system (not shown) by using the network interface unit 811.

The memory further includes a computer program, stored in a memory and configured to be executed by one or more processors, to implement the method for providing immersive media.

Figure 9:
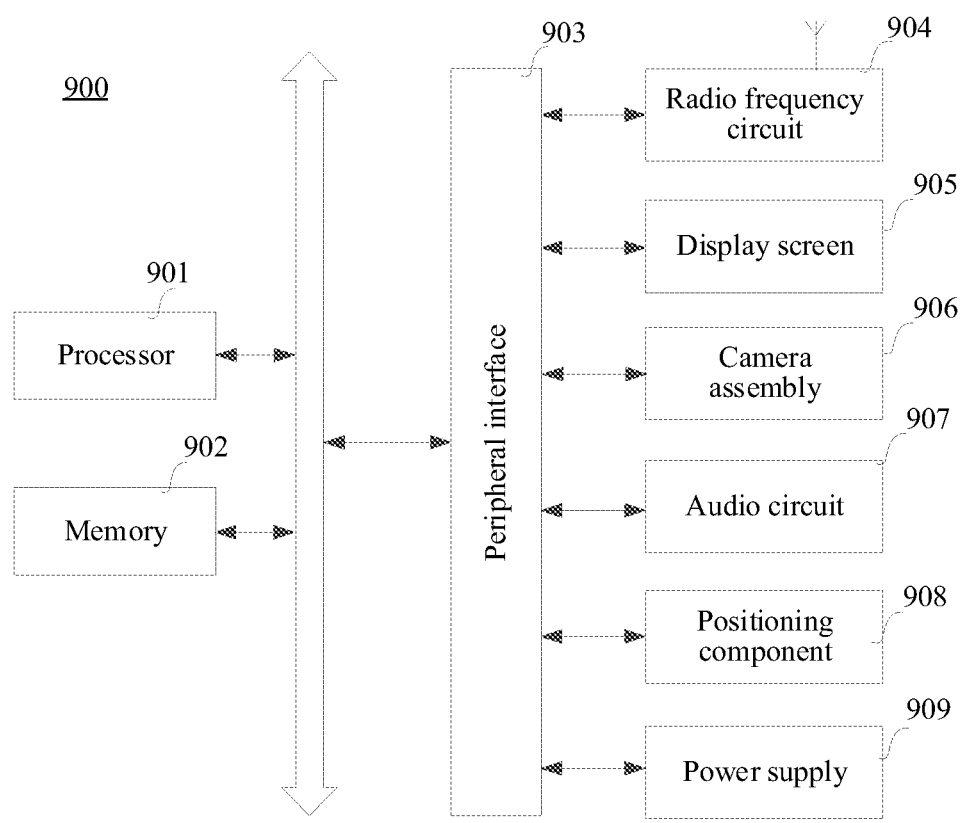
FIG. 9 is a diagram of a terminal according to an embodiment.

FIG. 9 is a diagram of a terminal according to an embodiment. The terminal 900 may be an electronic device such as a mobile phone, a tablet computer, a multimedia player, a television, a projector, a display, a wearable device, or a PC. The terminal may be configured to implement the method for obtaining immersive media provided in the foregoing embodiments. Specifically:

Generally, the terminal 900 includes a processor 901 and a memory 902.

The processor 901 may include one or more processing cores such as a 4-core processor or an 8-core processor. The processor 901 may be implemented by using at least one hardware form of digital signal processor (DSP), a field-programmable gate array (FPGA), and a programmable logic array (PLA). The processor 901 may alternatively include a main processor and a coprocessor. The main processor is a processor configured to process data in an active state, also referred to as a CPU. The coprocessor is a low-power processor configured to process data in a standby state. In some embodiments, the processor 901 may be integrated with a graphics processing unit (GPU). The GPU is configured to render and draw content that needs to be displayed on a display screen. In some embodiments, the processor 901 may further include an artificial intelligence (AI) processor. The AI processor is configured to process computing operations related to machine learning.

The memory 902 may include one or more computer-readable storage media. The computer-readable storage media may be non-volatile. The memory 902 may further include a high-speed random access memory and a non-volatile memory, such as one or more magnetic disk storage devices or a flash storage device. In some embodiments, the non-volatile computer-readable storage medium in the memory 902 is configured to store at least one instruction, at least one program, a code set, or an instruction set, the at least one instruction, the at least one program, the code set, or the instruction set being configured to be executed by one or more processors to implement the method for obtaining immersive media.

In some embodiments, the terminal 900 may further include: a peripheral interface 903 and at least one peripheral. The processor 901, the memory 902, and the peripheral interface 903 may be connected to each other by a bus or a signal cable. Each peripheral may be connected to the peripheral interface 903 by a bus, a signal cable, or a circuit board. Specifically, the peripheral includes: at least one of a radio frequency circuit 904, a touch display screen 905, a camera assembly 906, an audio circuit 907, a positioning component 908, and a power supply 909.

A person skilled in the art may understand that a structure shown in FIG. 9 constitutes no limitation on the terminal 900, and the computer device may include more or fewer components than those shown in the figure, or combine some components, or use a different component deployment.

In an exemplary embodiment, a computer device is further provided, including a processor and a memory, the memory storing a processor executable instruction, the instruction, when executed by one or more processors, implementing the method for providing immersive media or the method for obtaining immersive media. The computer device may include the server shown in FIG. 8 and the terminal shown in FIG. 9.

In an exemplary embodiment, a computer-readable storage medium is further provided, storing a processor executable instruction, the instruction, when executed by one or more processors, implementing the method for providing immersive media. The one or more processors may be in the server.

In an exemplary embodiment, a computer-readable storage medium is further provided, storing a processor executable instruction, the instruction, when executed by one or more processors, implementing the method for obtaining immersive media. The one or more processors may be in the terminal.

The computer-readable storage medium may further include: a ROM, a RAM, a solid state drive (SSD), an optical disc, or the like. The random access memory may include a resistance random access memory (ReRAM) and a dynamic random access memory (DRAM).

According to an aspect of the disclosure, a computer program product or a computer program is provided, the computer program product or the computer program including computer instructions, the computer instructions being stored in a computer-readable storage medium. A processor of a server reads the computer instructions from the computer-readable storage medium and executes the computer instructions to cause the server to perform the method for providing immersive media. A processor of a terminal reads the computer instructions from the computer-readable storage medium and executes the computer instructions to cause the terminal to perform the method for obtaining immersive media.

It is to be understood that "plurality of" mentioned in the specification means two or more. The terms "and/or" describes an association relationship between associated objects and represents that three relationships may exist. For example, A and/or B may represent the following three cases: only A exists, both A and B exist, and only B exists. The character "/" generally indicates an "or" relationship between the associated objects. In addition, the step numbers described in this specification merely exemplarily show a possible execution sequence of the steps. In some other embodiments, the steps may not be performed according to the number sequence. For example, two steps with different numbers may be performed simultaneously, or two steps with different numbers may be performed according to a sequence contrary to the sequence shown in the figures.

At least one of the components, elements, modules or units (collectively "components" in this paragraph) represented by a block in the drawings may be embodied as various numbers of hardware, software and/or firmware structures that execute respective functions described above, according to an example embodiment. According to example embodiments, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

The foregoing descriptions are merely example embodiments of this disclosure and are not intended to limit the protection scope of this disclosure. Any modification, equivalent replacement, or improvement made without departing from the spirit and range of this disclosure shall fall within the protection scope of this disclosure.

What is claimed is:

1. A method for providing immersive media, performed by at least one processor, the method comprising:
    obtaining resolution description information, resolution selection strategy information, and zoom area type from file format information of immersive media content, wherein immersive media in the target immersive media file comprises a plurality of regions with each of the plurality of regions having an associated respective identification number and respective zoom ratio, wherein the respective zoom ratio for each of the plurality if regions is a zoom relative to an original region of the immersive media, and wherein the respective identification number and the respective zoom ratio is comprised in the resolution description information;
    determining a target immersive media file to be provided to a client based on the resolution description information, the resolution selection strategy information, and the zoom area type,
    wherein the resolution description information further comprises:
        a zoom algorithm type field that indicates an algorithm type of the respective region, and
        a zoom symbolization type field that indicates a boundary type of the respective region, wherein a target resolution of the target immersive media file is determined based on:
- a value of a resolution selection strategy type comprised in the resolution selection strategy information,
- a first value of the resolution selection strategy type indicating that a lower resolution from among a device capability information and a maximum candidate resolution of the immersive media content is selected as the target resolution, and
- a second value of the resolution selection strategy type indicating that, when a bandwidth limit of the client is higher than a threshold described in a zoom strategy description parameter, a lower resolution from among the maximum candidate resolution of the immersive media content and a resolution associated with a user permission level is selected as the target resolution; and wherein a zoom region presented on the target immersive media file is based on one of:
- a first value of the zoom area type indicating that the target immersive media is zoomed according to creative intent of content provider, and
- a second value of the zoom area type indicating that the target immersive media is zoomed according to viewing statistics; and transmitting the target immersive media file to the client.

2. The method of claim 1, wherein the resolution description information is configured to define a candidate resolution of the immersive media content; and
wherein the resolution selection strategy information is configured to define the resolution selection strategy of the immersive media content.

3. The method of claim 2, wherein the resolution description information comprises:
- a zoom ratio indication field, configured to indicate a zoom ratio of a zoom region in the immersive media content;
- wherein a value of the zoom ratio indication field of 0 indicates that the zoom region is not zoomed relative to an original region;
- wherein the value of the zoom ratio indication field of 1 indicates that the zoom region is ½ of the original region in width and height;
- wherein the value of the zoom ratio indication field of 2 indicates that the zoom region is ¼ of the original region in width and height;
- wherein the value of the zoom ratio indication field of 3 indicates that the zoom region is ⅙ of the original region in width and height; and
- wherein the value of the zoom ratio indication field of 4 indicates that the zoom region is ⅛ of the original region in width and height.

4. The method of claim 1, wherein the resolution selection strategy information further comprises:
- a zoom strategy description field, configured to provide a text description of the resolution selection strategy and a specific bandwidth limitation associated with the client; and
- a zoom strategy description length field, configured to indicate a length of the text description in the zoom strategy description field.

5. The method of claim 1, wherein the device capability information is configured to indicate a maximum resolution supported by a device in an area in which the client is located; and wherein the user permission level is configured to indicate a maximum resolution supported by a user level of a user associated with the client.

6. The method of claim 1, wherein the device capability information is received as a part of a request for immersive media playback from the client.

7. The method of claim 1, wherein the respective zoom ratio has a value corresponding to a specific candidate resolution of a respective region among the plurality of regions.

8. An apparatus, comprising:
at least one memory configured to store computer program code; and
at least one processor configured to access said computer program code and operate as instructed by said computer program code, said computer program code comprising:
first obtaining code configured to cause the at least one processor to obtain resolution description information, resolution selection strategy information, and zoom area type from file format information of immersive media content, wherein immersive media in the target immersive media file comprises a plurality of regions with each of the plurality of regions having an associated respective identification number and respective zoom ratio, wherein the respective zoom ratio for each of the plurality if regions is a zoom relative to an original region of the immersive media, and wherein the respective identification number and the respective zoom ratio is comprised in the resolution description information;
first determining code configured to cause the at least one processor to determine a target immersive media file to be provided to a client based on the resolution description information, the resolution selection strategy information, and the zoom area type,
wherein the resolution description information further comprises:
- a zoom algorithm type field that indicates an algorithm type of the respective region, and
- a zoom symbolization type field that indicates a boundary type of the respective region,
wherein a target resolution of the target immersive media file is determined based on:
- a value of a resolution selection strategy type comprised in the resolution selection strategy information,
- a first value of the resolution selection strategy type indicating that a lower resolution from among a device capability information and a maximum candidate resolution of the immersive media content is selected as the target resolution, and
- a second value of the resolution selection strategy type indicating that, when a bandwidth limit of the client is higher than a threshold described in a zoom strategy description parameter, a lower resolution from among the maximum candidate resolution of the immersive media content and a resolution associated with a user permission level is selected as the target resolution; and wherein a zoom region presented on the target immersive media file is based on one of:
- a first value of the zoom area type indicating that the target immersive media is zoomed according to creative intent of content provider, and
- a second value of the zoom area type indicating that the target immersive media is zoomed according to viewing statistics; and first transmitting code configured to cause the at least one processor to transmit the target immersive media file to the client.

9. The apparatus of claim 8, wherein the resolution description information is configured to define a candidate resolution of the immersive media content; and
wherein the resolution selection strategy information is configured to define the resolution selection strategy of the immersive media content.

10. The apparatus of claim 9, wherein the resolution description information comprises:
a zoom ratio indication field, configured to indicate a zoom ratio of a zoom region in the immersive media content, wherein different zoom regions correspond to different respective candidate resolutions;
wherein a value of the zoom ratio indication field of 0 indicates that the zoom region is not zoomed relative to an original region;
wherein the value of the zoom ratio indication field of 1 indicates that the zoom region is ½ of the original region in width and height;
wherein the value of the zoom ratio indication field of 2 indicates that the zoom region is ¼ of the original region in width and height;
wherein the value of the zoom ratio indication field of 3 indicates that the zoom region is ⅙ of the original region in width and height; and
wherein the value of the zoom ratio indication field of 4 indicates that the zoom region is ⅛ of the original region in width and height.

11. The apparatus of claim 8, wherein the resolution selection strategy information further comprises:
a zoom strategy description field, configured to provide a text description of the resolution selection strategy and a specific bandwidth limitation associated with the client; and
a zoom strategy description length field, configured to indicate a length of the text description in the zoom strategy description field.

12. The apparatus of claim 8, wherein the device capability information is configured to indicate a maximum resolution supported by a device in an area in which the client is located; and wherein the user permission level is configured to indicate a maximum resolution supported by a user permission level of a user associated with the client.

13. A non-transitory computer-readable storage medium storing computer instructions that, when executed by at least one processor, cause the at least one processor to:
obtain resolution description information, resolution selection strategy information, and zoom area type from file format information of immersive media content, wherein immersive media in the target immersive media file comprises a plurality of regions with each of the plurality of regions having an associated respective identification number and respective zoom ratio, wherein the respective zoom ratio for each of the plurality if regions is a zoom relative to an original region of the immersive media, and wherein the respective identification number and the respective zoom ratio is comprised in the resolution description information;
determine a target immersive media file to be provided to a client based on the resolution description information, the resolution selection strategy information, and the zoom area type,
wherein the resolution description information further comprises:
a zoom algorithm type field that indicates an algorithm type of the respective region, and
a zoom symbolization type field that indicates a boundary type of the respective region,
wherein a target resolution of the target immersive media file is determined based on:
a value of a resolution selection strategy type comprised in the resolution selection strategy information,
a first value of the resolution selection strategy type indicating that a lower resolution from among a device capability information and a maximum candidate resolution of the immersive media content is selected as the target resolution, and
a second value of the resolution selection strategy type indicating that, when a bandwidth limit of the client is higher than a threshold described in a zoom strategy description parameter, a lower resolution from among the maximum candidate resolution of the immersive media content and a resolution associated with a user permission level is selected as the target resolution; and wherein a zoom region presented on the target immersive media file is based on one of:
a first value of the zoom area type indicating that the target immersive media is zoomed according to creative intent of content provider, and
a second value of the zoom area type indicating that the target immersive media is zoomed according to viewing statistics; and
transmit the target immersive media file to the client.

14. The storage medium of claim 13, wherein the resolution description information is configured to define a candidate resolution of the immersive media content; and
wherein the resolution selection strategy information is configured to define the resolution selection strategy of the immersive media content.

15. The storage medium of claim 14, wherein the resolution description information comprises:
a zoom ratio indication field, configured to indicate a zoom ratio of a zoom region in the immersive media content, wherein different zoom regions correspond to different respective candidate resolutions;
wherein a value of the zoom ratio indication field of 0 indicates that the zoom region is not zoomed relative to an original region;
wherein the value of the zoom ratio indication field of 1 indicates that the zoom region is ½ of the original region in width and height;
wherein the value of the zoom ratio indication field of 2 indicates that the zoom region is ¼ of the original region in width and height;
wherein the value of the zoom ratio indication field of 3 indicates that the zoom region is ⅙ of the original region in width and height; and
wherein the value of the zoom ratio indication field of 4 indicates that the zoom region is ⅛ of the original region in width and height.

16. The storage medium of claim 13, wherein the resolution selection strategy information further comprises:
a zoom strategy description field, configured to provide a text description of the resolution selection strategy and a specific bandwidth limitation associated with the client; and a zoom strategy description length field, configured to indicate a length of the text description in the zoom strategy description field.

\* \* \* \* \*